(12) United States Patent
Lee et al.

(10) Patent No.: US 7,711,074 B2
(45) Date of Patent: May 4, 2010

(54) SYNC EXTRACTION APPARATUS IN COMMUNICATION SYSTEM AND METHOD THEREOF

(75) Inventors: Jae-Yong Lee, Seongnam-si (KR); Yun-Sang Park, Suwon-si (KR); Bong-Gee Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1254 days.

(21) Appl. No.: 11/216,851

(22) Filed: Aug. 31, 2005

(65) Prior Publication Data

US 2006/0062335 A1     Mar. 23, 2006

(30) Foreign Application Priority Data

Sep. 17, 2004    (KR)    ............ 10-2004-0074572

(51) Int. Cl.
    *H03D 1/00*    (2006.01)
(52) U.S. Cl. ............. 375/343; 375/260; 375/362; 375/363; 375/364; 375/365; 375/366; 375/368
(58) Field of Classification Search .......... 375/260, 375/362, 363, 364, 365, 366, 368, 343
    See application file for complete search history.

(56) References Cited

U.S. PATENT DOCUMENTS

| | | | | |
|---|---|---|---|---|
| 5,991,289 A | * | 11/1999 | Huang et al. ............ | 370/350 |
| 6,614,864 B1 | * | 9/2003 | Raphaeli et al. ........ | 375/371 |
| 7,218,691 B1 | * | 5/2007 | Narasimhan ............. | 375/344 |
| 2002/0154715 A1 | * | 10/2002 | Jin et al. .................. | 375/347 |
| 2006/0093076 A1 | * | 5/2006 | Lee et al. .................. | 375/343 |

FOREIGN PATENT DOCUMENTS

| | | |
|---|---|---|
| EP | 0 896 457 | 2/1999 |
| EP | 1 282 257 | 2/2003 |
| JP | 07-143096 | 6/1995 |
| JP | 2000-252948 | 9/2000 |
| JP | 2001-333043 | 11/2001 |
| JP | 2002-057657 | 2/2002 |
| JP | 2002-158727 | 5/2002 |
| JP | 2002-368712 | 12/2002 |
| JP | 2003-333011 | 11/2003 |
| WO | WO 2004/030268 | 4/2004 |
| WO | WO 2004/062150 | 7/2004 |

* cited by examiner

*Primary Examiner*—Chieh M Fan
*Assistant Examiner*—Siu M Lee
(74) *Attorney, Agent, or Firm*—The Farrell Law Firm, LLP (57) ABSTRACT

A synchronization extraction apparatus for a communication system and a method thereof are disclosed. A frame synchronization is obtained in a manner that the sum of an input signal and a delay signal is obtained without obtaining a simple correlation value between the input signal and the delay signal, and then a correlation value between a summed signal and the delay signal is obtained. The synchronization extraction apparatus and method can reduce the implementation complexity and power consumption in obtaining the frame synchronization, and thus increase the battery cycle of a terminal provided with the synchronization extraction apparatus or method.

8 Claims, 6 Drawing Sheets

SYNC EXTRACTION APPARATUS IN COMMUNICATION SYSTEM AND METHOD THEREOF

PRIORITY

This application claims priority to an application entitled "Sync Extraction Apparatus in Communication System and Method Thereof" filed in the Korean Industrial Property Office on Sep. 17, 2004 and assigned Serial No. 2004-74572, the contents of which are hereby incorporated by reference.

BACKGROUND OF THE INVENTION

1. Field of the Invention

The present invention relates to a synchronization (sync) obtaining apparatus using periodically repeated signal patterns and a method thereof.

2. Description of the Related Art

In a communication system, a transmitter transmits a sync signal to a receiver, and the receiver performs a synchronization using the sync signal.

Recently, for a high-rate data transmission, a communication system that adopts an OFDMA (Orthogonal Frequency Division Multiple Access) system has been proposed in the Institute of Electrical and Electronic Engineers (IEEE) 802.16 standard committee. According to this IEEE 802.16 Standard, in the OFDMA type communication system, a transmitter transmits a preamble pattern to a receiver, and the receiver acquires the start of a frame, i.e. the frame sync, from the received preamble pattern. This preamble pattern is illustrated in FIGS. 1A and 1B.

Figure 1A:
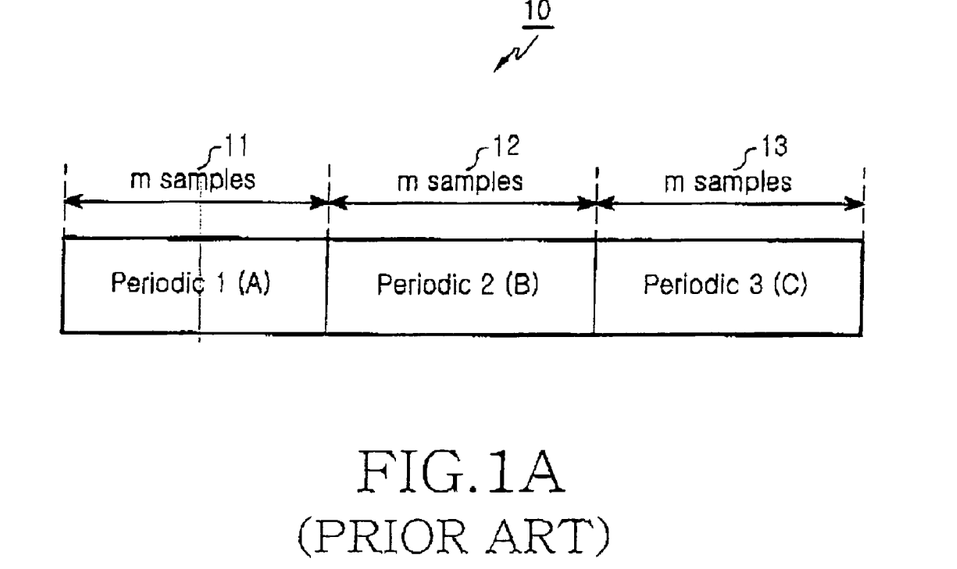
FIGS. 1A and 1B are diagrams illustrating the preamble pattern used for an initial sync in a communication system.
Figure 1B:
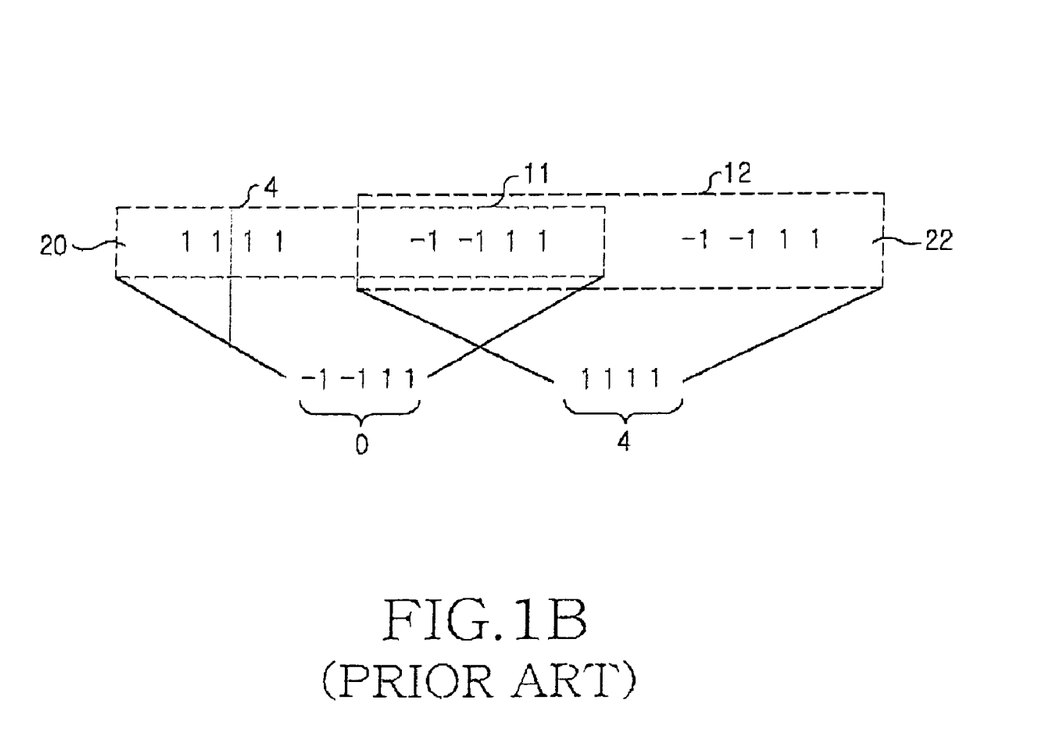

FIGS. 1A and 1B are diagrams illustrating the preamble pattern used for an initial sync in a communication system. Specifically, FIG. 1A illustrates a repeated pattern of the preamble pattern, and FIG. 1B illustrates how the preamble pattern is detected.

Referring to FIG. 1A, the preamble pattern 10 has repeated patterns 11, 12 and 13. In any two successive periods of such repeated patterns, the receiver delays a signal of an 'A' period, correlates the delay signal of the 'A' period with a signal of a 'B' period, and then sums the two signals. In this case, if the 'A' period signal and the 'B' period signal have the same pattern, their summed value becomes a maximum value. Accordingly, if the respective signal period is composed of m samples, 2 m samples must be accumulated. For example, referring to FIG. 1B, the repeated patterns of the preamble pattern are indicated as reference numerals 11 and 12. Specifically, a signal period of "−1 −1 1 1" is obtained by delaying the first signal period 4 of "1 1 1 1" and correlating the delayed first signal period with the second signal period 11 of "−1 −1 1 1", and then "0" is obtained by summing the obtained signal period. Then, a signal period of "1 1 1 1" is obtained by correlating the second signal period 11 of "−1 −1 1 1" with the third signal period 12 of "−1 −1 1 1", and "4" is obtained by summing the obtained signal period. Accordingly, if the same signals are repeated, the start point thereof can be found by detecting the signal period by detecting when the summed correlation value becomes a maximum value, and in the same manner, the frame sync can also be extracted.

Figure 2:
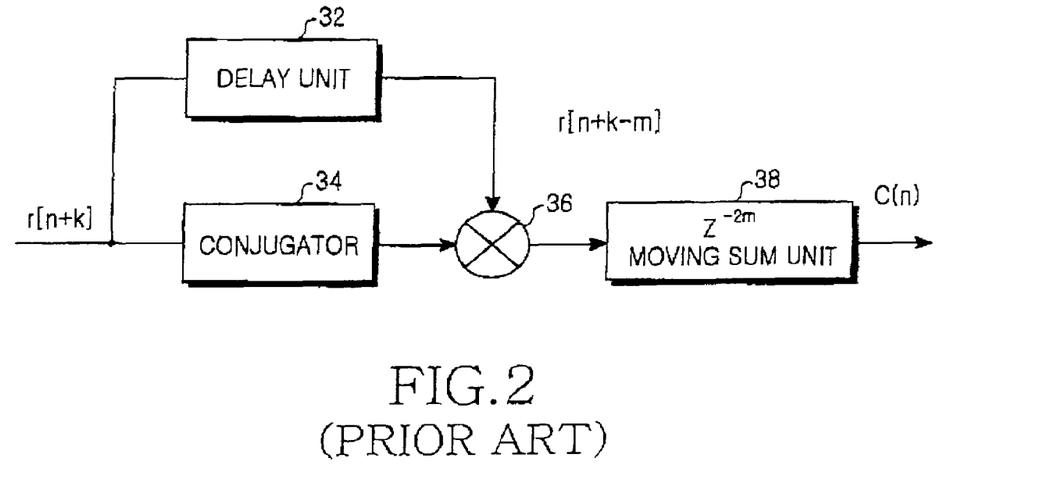
FIG. 2 is a block diagram of a conventional sync extraction apparatus.

FIG. 2 is a block diagram of a conventional sync extraction apparatus. Referring to FIG. 2, the conventional sync extraction apparatus includes an delay unit 32, a conjugator 34, a correlator 36, and a $Z^{-2m}$ moving sum unit 38. The delay unit 32 delays an input signal for a period corresponding to m samples. The conjugator 34 conjugates the input signal. The correlator 36 correlates an output signal of the delay unit 32 with an output signal of the conjugator 34, and outputs a correlated signal to the $Z^{-2m}$ moving sum unit 38. Here, the $Z^{-2m}$ moving sum unit 38 sums the correlation values output from the correlator 36, but in this case, the summing should be performed with respect to 2 m samples. As a result, this summing operation causes an increase in of circuit complexity and power consumption.

SUMMARY OF THE INVENTION

Accordingly, the present invention has been designed to solve at least the above and other problems occurring in the prior art, and an object of the present invention is to provide a sync extraction apparatus for a communication system and a method thereof that can reduce the implementation complexity and power consumption while obtaining the frame sync.

In order to accomplish the above and other objects, according to the sync extraction apparatus and method of the present invention, a frame sync can be obtained in a manner that the sum of an input signal and a delay signal is obtained without obtaining a simple correlation value between the input signal and the delay signal, and then a correlation value between a summed signal and the delay signal is obtained.

In accordance with one aspect of the present invention, there is provided an apparatus for synchronizing to a signal having a periodically repeated structure, including a delay unit for delaying an input signal, a sum unit for summing the input signal and a delay signal, a correlator for correlating a summed signal with the delay signal, and a moving sum unit for summing output values of the correlator and providing a sync extraction value.

In accordance with another aspect of the present invention, there is provided a method for synchronizing to a signal having a periodically repeated structure, including the steps of delaying an input signal, summing the input signal and a delay signal, correlating a summed signal with the delay signal, and a moving sum unit for obtaining a moving sum of correlation values for an amount of delay and providing a sync extraction value.

In accordance with still another aspect of the present invention, there is provided a sync extraction apparatus in a system that uses a preamble signal having a periodically repeated structure in obtaining a frame sync, including a first delay unit for delaying an input signal for a period of a repeated pattern and providing a first delay signal, a conjugator for conjugating the first delay signal from the first delay unit, a second delay unit for delaying again the first delay signal from the first delay unit for the period of the repeated pattern and providing a second delay signal, a sum unit for accumulating the input signal and the second delay signal for the period of the repeated pattern, a correlator for correlating an output of the conjugator with an output of the sum unit, and a moving sum unit for obtaining a moving sum of outputs of the correlator for the period of the repeated pattern.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, the same drawing reference numerals are used for the same elements even in different drawings. It will be clear to those skilled in the art that the present invention can easily be practiced without such specific features contained herein or their modifications. Additionally, a detailed description of known functions and configurations incorporated herein will be omitted when it may obscure the subject matter of the present invention.

The present invention is constructed to detect an initial sync, i.e. a start position of the frame, in a system that uses a periodically repeated preamble pattern in obtaining a frame sync. A transmitter constructs and transmits a preamble as illustrated in FIG. 1. A receiver obtains the frame sync through searching for a position (i.e. section) having the largest correlation value by correlating the preamble pattern. In this case, a digital sample (time domain) received in the receiver includes the preamble pattern of FIG. 1, and this preamble pattern has repeated patterns. In the embodiment of the present invention, the complexity of the receiver can be reduced by reducing the sections in which the moving sums are obtained using the characteristic of the repeated patterns. In the embodiment of the present invention, the sums of the repeated sections are obtained, and then the correlation value thereof is obtained. Specifically, the receiver obtains the correlation of the preamble as expressed by Equation (1) in order to detect the start of the frame.

$$C[n] = \sum_{k=0}^{2m} (r*[n+k]r[n+k-m]) \quad (1)$$

Here, r[k] denotes a k-th received signal sample, and r*[k] denotes a complex-conjugated value of r[k]. In this case, if n=0 and no noise exists, the correlation value can be divided into two sections, that is, a section from k=0 to k=m and a section from k=m to k=2 m, as expressed by Equation (2).

$$C_{con} = \sum_{k=0}^{m} \left( r*[k]r[k-m] + \sum_{k=m}^{2m} (r*[k]r[k-m]) \right) \quad (2)$$

$$= \sum_{k=0}^{m} (r*[k]r[k-m]) + m \sum_{k=0}^{m} (r*[m+k]r[k])$$

$$= \text{Correlation}(B, A) + \text{Correlation}(C, B)$$

$$= 2M$$

Here, if the section from k=m to k=2 m is changed to the section from k=0 to k=m with respect to the correlation value $$\sum_{k=m}^{2m} (r*[k]r[k-m])$$

of the section, the correlation value is changed to $$\sum_{k=0}^{m} (r*[m+k]r[k]).$$

Accordingly, referring to FIG. 1, the correlation value between the conjugated period 2(B) and the period 1(A) becomes $$\sum_{k=0}^{m} (r*[k]r[k-m]),$$

and the correlation value between the conjugated period 3(C) and the period 2(B) becomes $$\sum_{k=0}^{m} (r*[m+k]r[k]).$$

Accordingly, the correlation value that the receiver intends to obtain becomes Correlation(B,A)+Correlation(C,B). Here, because the r[k] has a period of m samples and the preamble pattern has the repeated patterns, the correlation value can be arranged as shown in Equation (3).

$$\text{Correlation}(A, A) = \sum_{k=o}^{m} (r*[k]r[k]) = M, \quad (3)$$

$$\text{Correlation}(A, B) = \text{Correlation}(B, C) =$$

$$\sum_{k=o}^{m} (r*[k]r[k-m]) = \sum_{k=o}^{m} (r*[k+m]r[k]) = \sum_{k=o}^{m} (r*[k]r[k]) = M$$

Here, if two terms of $$\sum_{k=o}^{m} (r*[k]r[k-m]) + \sum_{k=o}^{m} (r*[m+k]r[k])$$

are tied into a term with a factor of r*[n+k−m], Equation (4) is obtained.

$$C[n] = \sum_{k=0}^{m} ((r[n+k] + r[n+k-2m])r*[n+k-m]) \quad (4)$$

Hereinafter, the sync extraction apparatus for obtaining the correlation value for the sync extraction according to the present invention will be explained.

Figure 3:
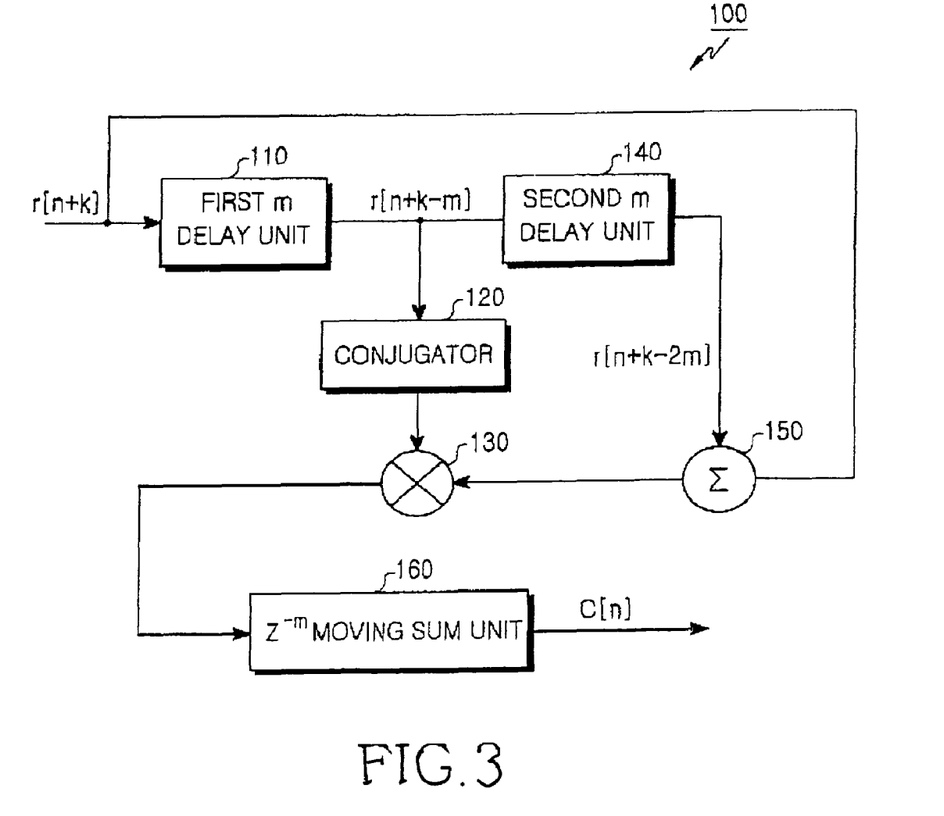
FIG. 3 is a block diagram of a sync extraction apparatus according to a first embodiment of the present invention.

FIG. 3 is a block diagram of a sync extraction apparatus according to a first embodiment of the present invention. Referring to FIG. 3, the sync extraction apparatus 100 according to the first embodiment of the present invention includes a first m delay unit 110, a conjugator 120, a correlator 130, a second m delay unit 140, a sum unit 150 and a $Z^{-m}$ moving sum unit 160. The first m delay unit 110 delays an input signal for a period corresponding to m samples. Accordingly, the first m delay unit 110 delays the input signal r[n+k] by m samples, and outputs a signal r[n+k−m]. The conjugator 120 conjugates the signal r[n+k−m] output from the first m delay unit 110 and outputs the conjugated signal to the correlator 130. Additionally, the second m delay unit 140 delays the signal r[n+k−m] output from the first m delay unit 110 by m samples, and outputs a signal r[n+k−2 m] to the sum unit 150. The sum unit 150 receives the input signal r[n+k] and the signal r[n+k−2 m] output from the second m delay unit 140. The sum unit 150 accumulates the input signal from k=0 to k=m and the signal r[n+k−2 m] output from the second m delay unit 140, and outputs the accumulated signal to the correlator 130. The correlator 130 correlates $$\sum_{k=0}^{m}(r[n+k]+r[n+k-2m])$$

output from the sum unit with a conjugated value r*[n+k−m] of the signal r[n+k−m] output from the conjugator 120, and outputs a correlation value to the $Z^{-m}$ moving sum unit 160.

The $Z^{-m}$ moving sum unit 160 sums the correlation values output from the correlator 130, and in particular, performs the summing of the m samples. The correlation value output from the $Z^{-m}$ moving sum unit 160 can be arrange as shown in Equation (5).

$$\begin{aligned}C_{new} &= \sum_{k=0}^{m}((r[m+k]+r[k-m])r*[k]) \\ &= \sum_{k=o}^{m}(r[m+k]r*[k]) + \sum_{k=o}^{m}(r[k-m])r*[k]) \\ &= \text{Correlation}(C, B) + \text{Correlation}(A, B) \\ &= 2M\end{aligned} \quad (5)$$

The correlation value obtained as above is given as a sum of the correlation value between the period 2(B) and the period 3(C) and the correlation value between the period 1(A) and the period 2(B).

Figure 4:
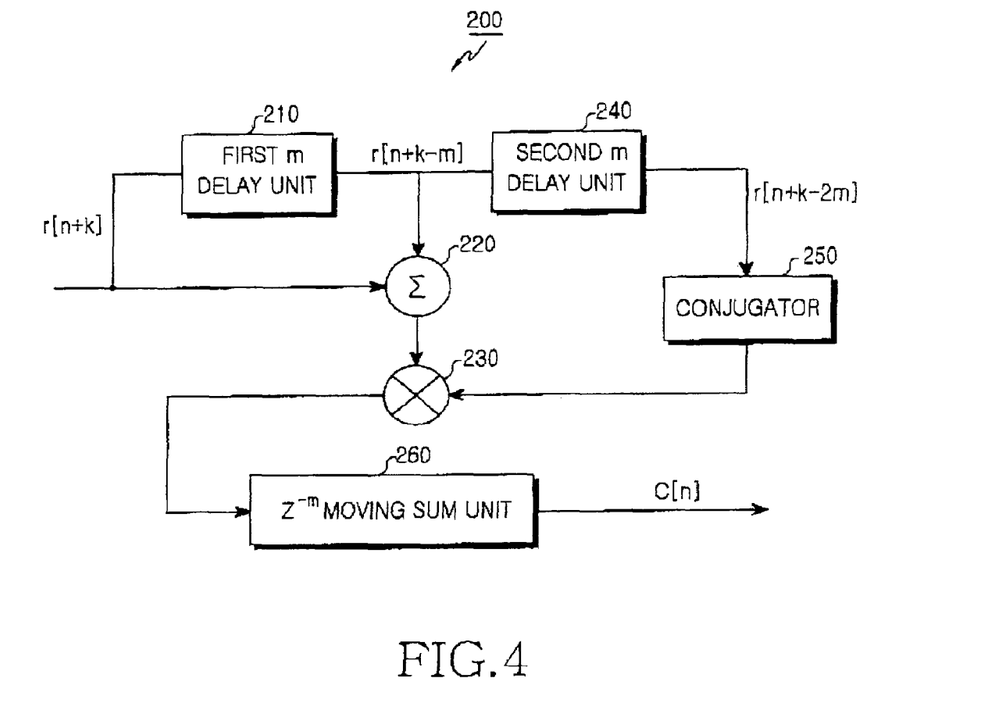
FIG. 4 is a block diagram of a sync extraction apparatus according to a second embodiment of the present invention.

FIG. 4 is a block diagram of the sync extraction apparatus according to a second embodiment of the present invention. Referring to FIG. 4, the sync extraction apparatus 200 according to the second embodiment of the present invention includes a first m delay unit 210, a sum unit 220, a correlator 230, a second m delay unit 240, a conjugator 250 and a $Z^{-m}$ moving sum unit 260. In the similar manner to the first embodiment of the present invention, the first m delay unit 210 delays an input signal for a period corresponding to m samples. Accordingly, the first m delay unit 210 delays the input signal r[n+k] by m samples, and outputs a signal r[n+k−m].

The sum unit 220 receives the input signal r[n+k] and the signal r[n+k−m] output from the first m delay unit 210. The sum unit 220 accumulates the input signal r[n+k] from k=0 to k=m and the signal r[n+k−m] output from the first m delay unit 210, and outputs the accumulated signal to the correlator 130.

Additionally, the second m delay unit 240 delays the signal r[n+k−m] output from the first m delay unit 210 by m samples, and outputs a signal r[n+k−2 m] to the conjugator 250. The conjugator 250 conjugates the signal r[n+k−2 m] output from the second m delay unit 240, and outputs the conjugated signal to the correlator 230. The correlator 230 correlates $$\sum_{k=O}^{M}(r[n+k]+r[n+k-m])$$

output from the sum unit 220 with a conjugated value r*[n+k−2 m] of the signal r[n+k−2 m] output from the conjugator 250, and outputs a correlation value to the $Z^{-m}$ moving sum unit 260.

The $Z^{-m}$ moving sum unit 260 sums the correlation values output from the correlator 230, and in particular, performs the summing of the m samples.

The features of the sync extraction apparatus according to the present invention in comparison to those of the conventional sync extraction apparatus are described in Table 1.

TABLE 1

| Classification | Prior Art | Present Invention | Remarks |
| --- | --- | --- | --- |
| Conjugate | One | One | * Both are of a complex type, and I and Q mean the respective numbers of bits. |
| Delay Element (12 bits) | m (12 bits) | 2 m (12 bits) | * m = [2048/3] = 683 (802.16 OFDMA) |
| Add | | 12 bit Adder | * Omitted under the assumption that the same adders are used in the respective moving sum adders. |
| Multiply | 12 × 12 bits | 12 × 13 bits | |
| Moving Sum | 2 m (24 bits) | m (25 bits) | The present invention can reduce the number of delay elements having a large number of bits. |

As shown in Table 1, the sync extraction apparatus according to the present invention can reduce the complexity of the receiver by reducing the section in which the moving sum unit obtains the moving sums in comparison to the conventional sync extraction unit.

In the embodiment of the present invention, the complex values of the signals are summed in the moving sum unit. However, it is also possible that the real values are first obtained and then the real values are summed in the moving sum unit instead of summing the complex values of the signals in the moving sum unit.

Figure 5:
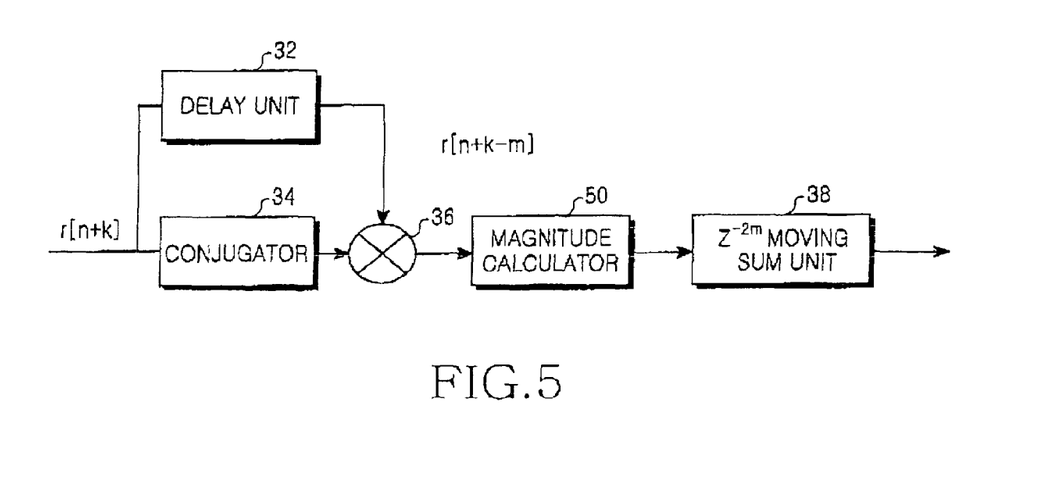
FIG. 5 is a block diagram of a sync extraction apparatus according to a third embodiment of the present invention.

FIG. 5 is a block diagram of the sync extraction apparatus according to a third embodiment of the present invention. In the sync extraction apparatus according to the third embodiment of the present invention, a magnitude calculator 50 is arranged in front of a $z^{-2\,m}$ moving sum unit 38. Accordingly, the complex value output from the correlator 36 is converted into a real value by the magnitude calculator 50, and then the real value is provided to the $Z^{-2m}$ moving sum unit 38.

Figure 6:
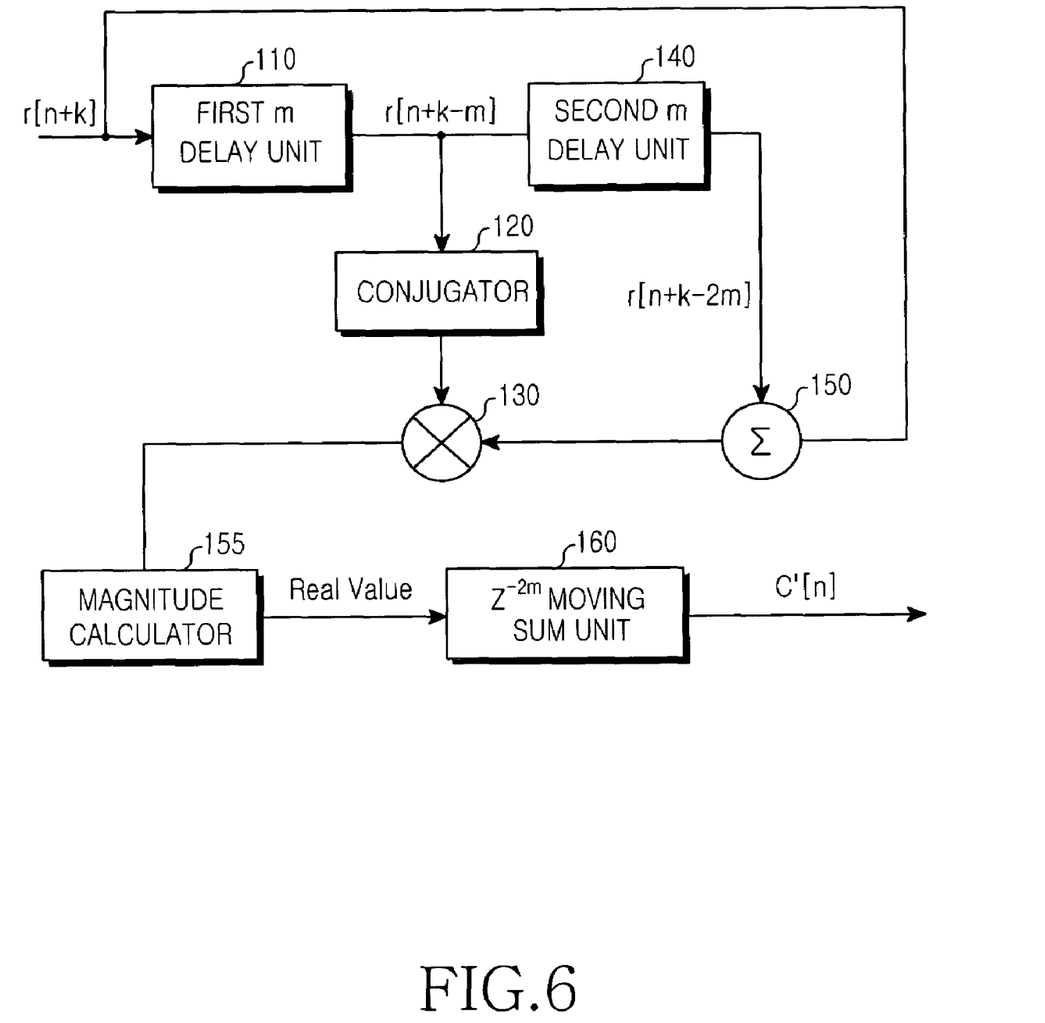
FIG. 6 is a block diagram of a sync extraction apparatus according to a fourth embodiment of the present invention.

FIG. 6 is a block diagram of the sync extraction apparatus according to a fourth embodiment of the present invention.

According to the sync extraction apparatus according to the fourth embodiment of the present invention, a magnitude calculator 155 is included before the input terminal of the $Z^{-m}$ moving sum unit 160 illustrated in FIGS. 3 and 4. Accordingly, the complex value output from the correlator 130 or 230 is converted into a real value by the magnitude calculator 155, and then the real value is provided to the $Z^{-m}$ moving sum unit 160.

Figure 7:
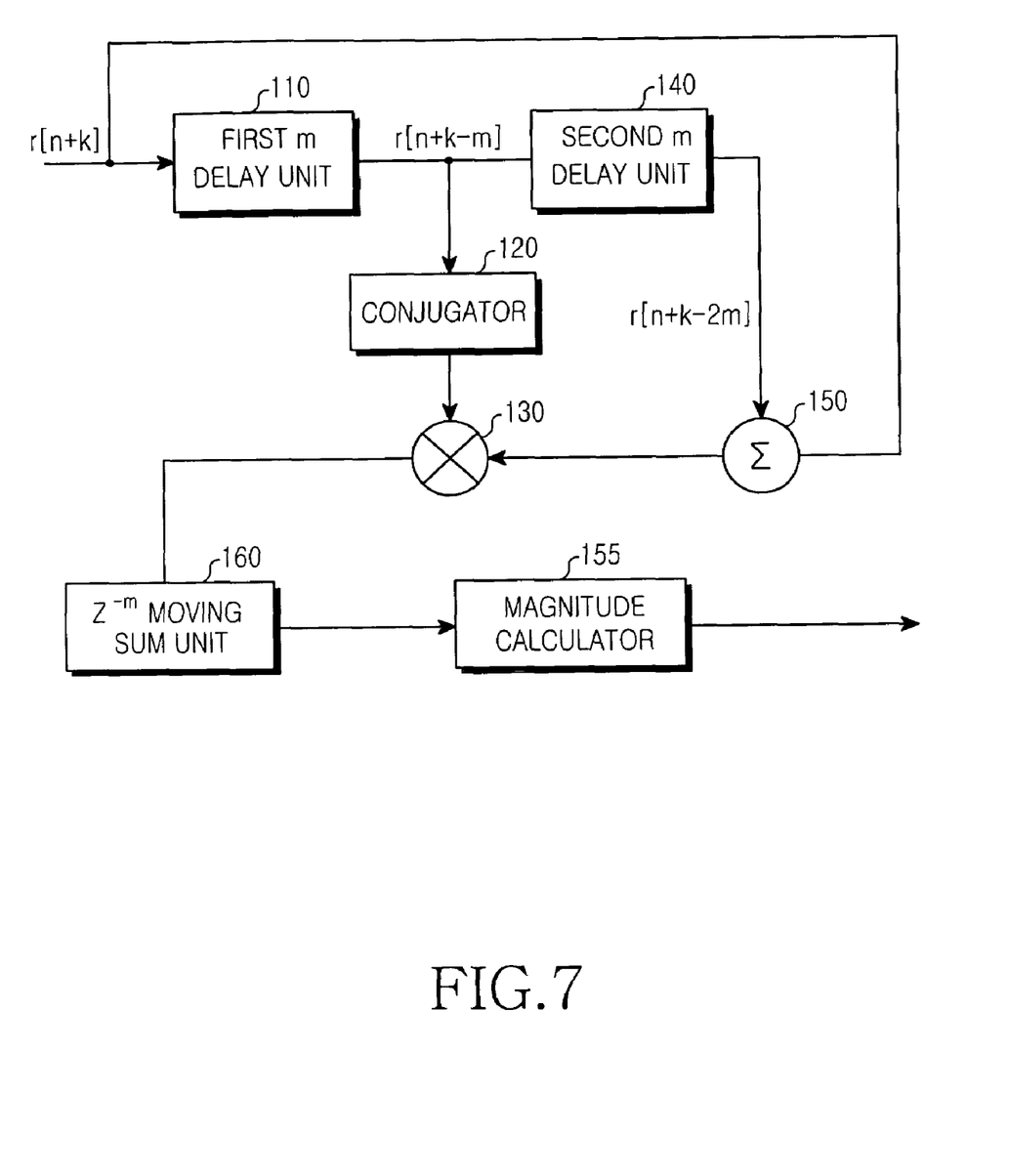
FIG. 7 is a block diagram of a sync extraction apparatus according to a fifth embodiment of the present invention.

FIG. 7 is a block diagram of the sync extraction apparatus according to a fifth embodiment of the present invention. According to the sync extraction apparatus according to the fifth embodiment of the present invention, a magnitude calculator 155 is included after the output terminal of the moving sum unit 160 or 260 illustrated in FIGS. 3 and 4. If no noise exists and the repeated symbol values accurately coincide with each other, The resultant value C(n) becomes a real number. However, if a noise and a signal distortion exist, C(n) has the complex value, and thus a magnitude circuit should be added for a comparison operation as in FIGS. 5, 6 and 7. The constructions of FIGS. 5 and 6 have a somewhat degraded performance in comparison to the construction of FIG. 6, but may improve the complexity. This is because the process of obtaining the magnitude of the real value and then obtaining the moving sum of the real value is simpler than the process of obtaining the moving sum of the complex value and then calculating the magnitude thereof.

Figure 8:
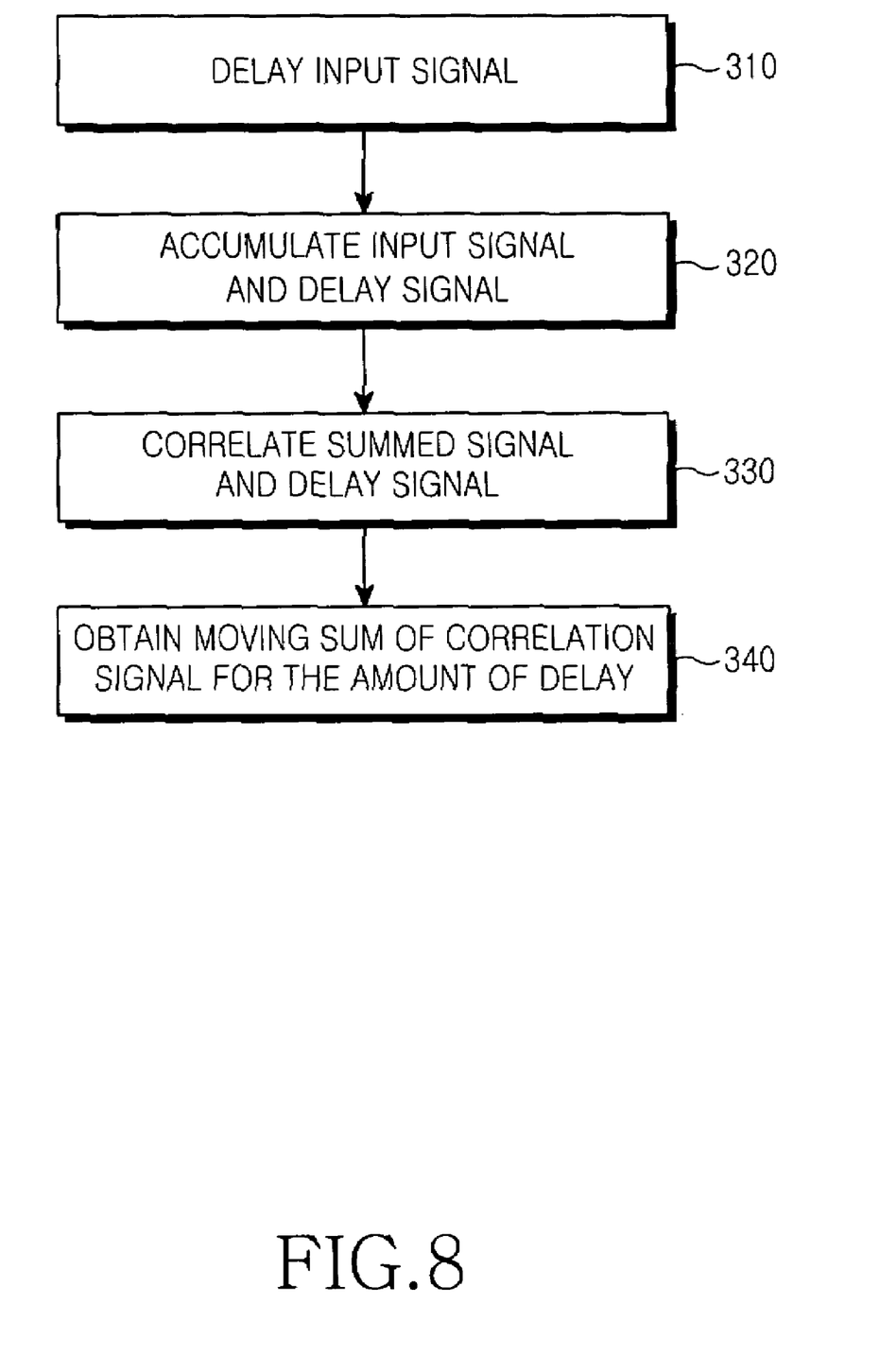
FIG. 8 is a flowchart illustrating a sync extraction method according to an embodiment of the present invention.

FIG. 8 is a flowchart illustrating a sync extraction method according to an embodiment of the present invention. Referring to FIG. 8, if a signal having a periodically repeated structure is received, the delay unit 110, 140, 210 or 240 of the sync extraction apparatus according to each embodiment of the present invention delays the signal for a period corresponding to m samples (step S310). In this case, m may be the number of samples included in the repeated period. Then, the sum unit 150 or 220 of the sync extraction apparatus generates a summed signal by accumulating the delay signal and the presently input signal (step S320). The correlator 130 or 230 of the sync extraction apparatus correlates the summed signal with the delay signal (step S330), and the moving sum unit 160 or 260 sums the correlated signals for the amount of delay and outputs a sync extraction value. Then, by detecting the time when the sync extraction value becomes a peak value, the sync can be obtained.

In the preferred embodiment of the present invention, the step of converting the complex value from the correlator into a real value may further be performed.

According to the present invention, the sums of the repeated sections are obtained and then the correlation values thereof are obtained. Accordingly, the section in which the moving sum is obtained is reduced, and thus the complexity of the receiver can be reduced.

As described above, according to the present invention, by reducing the implementation complexity of the frame sync extraction circuit, the circuit construction can be simplified with its power consumption lowered. Accordingly, the battery cycle of a terminal having the sync extraction circuit can be increased.

In the embodiments of the present invention, the present invention is applied to the OFDMA type frame sync extraction of the 802.16 standard. However, the present invention can also be applied to other systems for achieving the frame sync by delay and correlation using repeated preamble patterns.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A sync extraction apparatus for a signal having a periodically repeated pattern, comprising:
   a first delay unit for delaying an input signal of a receiver to produce a first delay signal;
   a second delay unit for delaying the first delay signal to produce a second delay signal;
   a sum unit for summing the input signal and the second delay signal to produce a summed signal;
   a correlate unit for correlating the summed signal with only the first delay signal;
   a moving sum unit for summing output values of the correlate unit and outputting a sync extraction value for performing synchronization by the receiver; and
   a magnitude calculator for converting one of the output values of the correlate unit into real values and an output of the moving sum unit into a real value.

2. The apparatus as claimed in claim 1, wherein:
   the first delay unit delays the input signal for a period of the periodically repeated pattern; and
   the second delay unit delays the first delay signal for the period of the periodically repeated pattern.

3. The apparatus as claimed in claim 2, wherein the sum unit accumulates the input signal and the second delay signal for the period of the periodically repeated pattern to output an accumulated signal.

4. The apparatus as claimed in claim 2, wherein the correlate unit comprises:
   a conjugator for conjugating the first delay signal; and
   a correlator for correlating a conjugated value outputted from the conjugator with a summed value outputted from the sum unit.

5. A method for synchronizing to a signal having a periodically repeated pattern, in a sync extraction apparatus, comprising the steps of:
   delaying an input signal of a receiver to obtain a first delayed signal;
   delaying the first delayed signal to obtain a second delayed signal;
   summing the input signal and the second delayed signal to produce a summed signal;
   correlating the summed signal with only the first delayed signal; and
   obtaining a moving sum of the correlated values for a period equal to a period the input signal is delayed, and outputting a sync extraction value for performing synchronization by the receiver;
   wherein, one of the correlated values are converted into real values and the moving sum value is converted into a real value.

6. The method as claimed in claim 5, wherein:
   the first delaying step delays the input signal for a period of the periodically repeated pattern and the second delaying step delays the first delayed signal for the period of the periodically repeated pattern.

7. The method as claimed in claim 6, wherein the summing step accumulates the input signal and the second delayed signal for the period of the periodically repeated pattern.

8. The method as claimed in claim 6, wherein the correlating step comprises the steps of:
   conjugating the first delayed signal; and
   correlating the conjugated value with the summed value obtained at the summing step.

* * * * *